United States Patent Office 2,832,757
Patented Apr. 29, 1958

2,832,757

BUTYROLACTONE INITIATED POLYMERIZATION OF CAPROLACTAM

Werner Münch, Cesano Maderno, and Luigi Notarbartolo and Rossana Lamma, Milan, Italy, assignors to Perfogit Societa per Azioni, Milan, Italy No Drawing. Application August 4, 1953
Serial No. 372,384

Claims priority, application Italy March 20, 1953

2 Claims. (Cl. 260—78)

It is known that polyamides may be prepared by polymerization of cyclic amides, in particular lactams. One industrially important example of such a preparation is furnished by the polymerization of caprolactam.

It is also known that such polymerizations must be initiated by the addition of small amounts of suitable substances. Numerous substances adapted for that purpose have been described and research has been carried out to study the mechanism whereby they cause the lactam ring to open and therefore the polymerization to begin.

It has now been found—and this is wholly unexpected and surprising—that the lactones may be employed as reaction initiators. Not only was this not known previously, but from what was known of the mechanism through which the reaction initiators operate, it was to be ruled out that the lactones could not serve to such an end.

The above statement is justified by the fact that all the reaction initiators hitherto known or described are substances that may, under certain conditions met with in the polymerization, lead to the formation of water. In some cases certain compounds were erroneously considered as reaction initiators while in fact they did not have such a property in the pure state but acted as initiators only because they contained impurities consisting of small amounts of moisture or of small amounts of other substances capable of reacting, under polymerization conditions, to cause the formation of water. Thus it has even been believed by some that, under certain conditions, caprolactam could polymerize with appreciable speed even in the absence of any reaction initiators: it has been proved on the contrary that the polymerization occurs only because impurities acting as initiators were present, Atmospheric moisture may be one of such impurities. Therefore when speaking of reaction initiators, reference must always be made to absolutely pure compounds, in particular to completely water-free compounds, the expression "water-free" as herein used implying the absence of even traces of moisture, and any assertion as to the activity of any specific substance as reaction initiator, must be critically examined in the light of the circumstances set forth above in order to ascertain beyond any possible doubt whether apparent activity might not be due to the presence of water or of other substances capable of causing the formation of water.

On the other hand, pure lactones are absolutely incapable of leading to the formation of water. Their behaviour as reaction initiators is therefore in opposition to everything that was hitherto known or believed to be true.

The invention is all the more surprising inasmuch as not all the lactones are capable of acting as reaction initiators when in the pure state. Among the lactones that may be used, butyrolactone stands out as particularly convenient.

It is to be observed that it is very advantageous to polymerize caprolactam in the complete absence of water. This is so because water, even in extremely small amounts, acts as a viscosity stabilizer of the polymer, and therefore, if water is present, the amount of other stabilizers which may or should be added is less than it would be in the absence of water; viz., said amount would be insufficient to keep the viscosity of the polymer at the desired value, were water not present. Now, the water contained in the polymer is easily lost, at least in part, in the course of the spinning operation; then, the viscosity of the polymer increases, and this is harmful. Considerable difficulties are thus experienced in stabilizing the polymer in such a way as to avoid an excess of stabilizer and at the same time to maintain the viscosity of the polymer at the desired value till the end of the spinning operation in spite of the loss of water contained in the polymer, or to prevent or compensate said loss by suitable means. All the aforesaid difficulties disappear when the polymerization is carried out with the absolute exclusion of water, as in this case the polymer can be stabilized with exactly measured amounts of stabilizers without having to fear subsequent viscosity increases. This is made possible in a simple and advantageous maner by this invention. The conditions under which the polymerization is carried out when using butyrolactone, preferably in a molar percentage substantially comprised between 0.05 and 2 do not substantially differ from the conditions known in the art with reference to the use of the other known reaction initiators: the essence of the invention consists on the wholly surprising fact that the lactones have proved capable of accomplishing the function set forth above. However, two embodiments of the invention will be now described by way of example.

*Example 1*

To 100 grams of pure, rigorously water-free caprolactam there are added 1.06 gr. (equivalent to a molar percentage of 1.4%) of equally water-free butyrolactone. The mass is fused and heated at 240–250° C. for about 28 hours in an hydrogen atmosphere. The lactam polymerizes and a clear, viscous mass, possessed of excellent spinning properties, is formed.

*Example 2*

To 100 grams of pure, rigorously water-free caprolactam there are added 3.05 gr. (equivalent to a molar percentage of 4%) of equally pure and water-free butyrolactone. The reagents are heated in an hydrogen atmosphere for about 12 hours to obtain a precondensate, and a clear, fluid but thick mass is formed. 10 gr. of the precondensate thus obtained are mixed to 90 gr. of water-free caprolactam and the reagents are heated in an hydrogen atmosphere first at 240–250° C. for about 12 hours and then at 230–235° C. for about 20 hours. At this stage the polymerization is finished and the mass can be spun. In this case the polymer contains 0.3% (molar percentage 0.4%) of butyrolactone. The viscosity in cresol of the non-extracted material, reckoned according to the formula of Carothers, is 1.02.

It is appropriate to stress that the disagreement between the observed results and what was hitherto known in the art has induced the inventors to take steps to make absolutely sure that the action of the lactones might not be due to impurities contained therein. Therefore the polymerization of caprolactam has been carried out by employing reagents, in particular butyrolactone, in a rigorously pure state and in the complete absence of any traces of moisture. It has been found that the polymerization of caprolactam does occur as set forth above in the complete absence of any impurities, in particular in the absence of moisture.

We claim:

1. In the thermal polymerization of caprolactam, the improvement consisting in initiating the polymerization of said caprolactam at polymerization temperatures in the presence of moisture-free butyrolactone and in the absence of any other reactants.

2. The process of claim 1, in which the butyrolactone is present in a molar percentage substantially comprised between 0.05 and 2.

References Cited in the file of this patent

UNITED STATES PATENTS

| | | |
|---|---|---|
| 2,551,702 | Prochazka | May 18, 1951 |
| 2,739,959 | Ney et al. | Mar. 27, 1956 |